United States Patent
Guene et al.

(10) Patent No.: US 11,852,528 B2
(45) Date of Patent: Dec. 26, 2023

(54) DEVICE AND METHOD FOR MEASURING OF A FLICKERING FREQUENCY

(71) Applicant: STMicroelectronics (Grenoble 2) SAS, Grenoble (FR)

(72) Inventors: Mickael Guene, Grenoble (FR); Salim Bouchene, Seyssinet-Pariset (FR); Cedric Grospellier, Grenoble (FR); Jean-Jacques Rouger, Grenoble (FR); Pascal Mellot, Grenoble (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 554 days.

(21) Appl. No.: 17/102,522

(22) Filed: Nov. 24, 2020

(65) Prior Publication Data
US 2021/0164832 A1 Jun. 3, 2021

(30) Foreign Application Priority Data
Nov. 29, 2019 (FR) ...................... 1913542

(51) Int. Cl.
*G01J 1/44* (2006.01)

(52) U.S. Cl.
CPC ...................... *G01J 1/44* (2013.01)

(58) Field of Classification Search
CPC ..... G01J 1/44; G01J 1/4257; G01J 2001/4247
See application file for complete search history.

(56) References Cited

U.S. PATENT DOCUMENTS

| | | | | |
|---|---|---|---|---|
| 2006/0054783 A1* | 3/2006 | Voronov | ............... | H04N 23/70 348/E5.081 |
| 2010/0277075 A1* | 11/2010 | Rees | ..................... | H03F 3/08 250/214 AG |
| 2019/0174123 A1* | 6/2019 | Munro | .................... | G06T 7/55 |

FOREIGN PATENT DOCUMENTS

GB 2350201 A 11/2000

OTHER PUBLICATIONS

Antonelli, A., et al., "PLL system for harmonic analysis", Environment and Electrical Engineering (EEEIC), 2011 10th International Conference On, IEEE, May 8, 2011, pp. 1-5, XP031946781.
Gallo, D., et al., "An Instrument for the Objective Measurement of Light Flicker," Instrumentation and Measurement Technology Conference, 2005. IMTC 2005. Proceedings of the IEEE Ottawa, ON, Canada, May 16-19, 2005, IEEE, vol. 3, pp. 1942-1947, XP010900794, Piscataway, NJ, USA.
Krzysztof, K., et al. "Rapid algorithm prototyping and implementation for power quality measurement," Eurasip Journal on Avdances in Signal Processing, vol. 2015, N°1, Mar. 10, 2015, XP055717913.
Lehman, B. et al., "Proposing measures of flicker in the low frequencies for lighting applications," Energy Conversion Congress and Exposition (ECCE), 2011 IEEE, IEEE, Sep. 17, 2011, pp. 2865-2872, XP032067547.

* cited by examiner

*Primary Examiner* — Tung S Lau
(74) *Attorney, Agent, or Firm* — Slater Matsil, LLP

(57) ABSTRACT

The present disclosure relates to a device and method for measuring a flicker frequency of a light source configured to implement at least one phase lock loop.

20 Claims, 1 Drawing Sheet

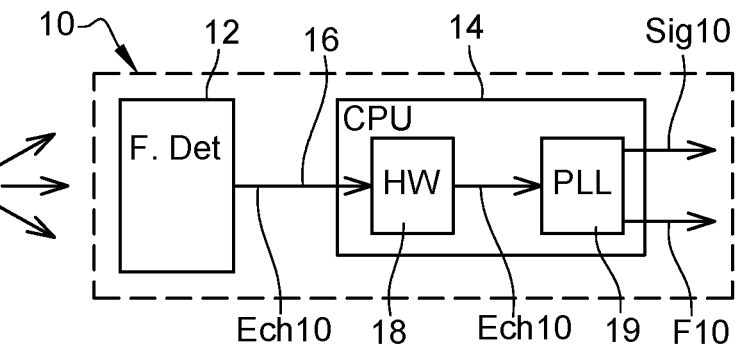
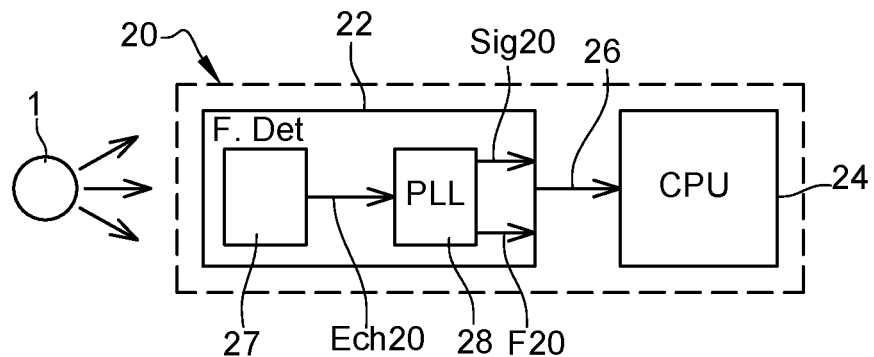
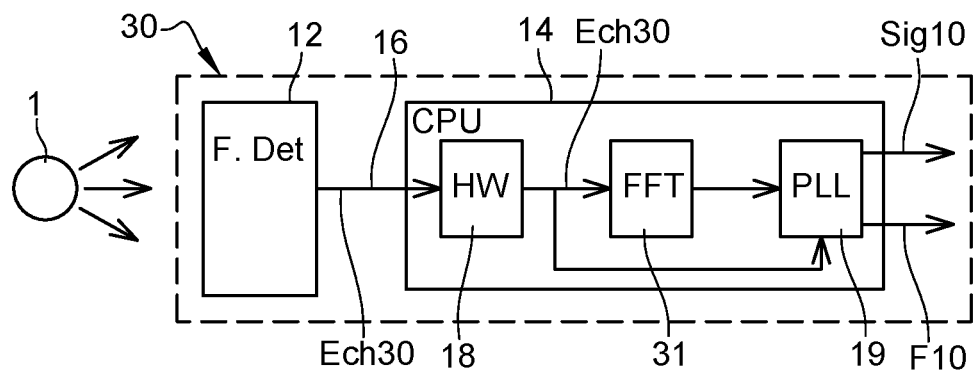
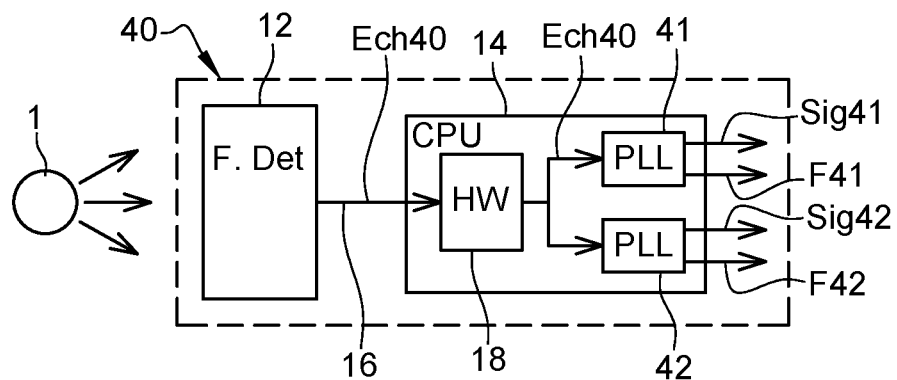

DEVICE AND METHOD FOR MEASURING OF A FLICKERING FREQUENCY

CROSS-REFERENCE TO RELATED APPLICATIONS

This application claims the benefit of French Application No. 1913542, filed on Nov. 29, 2019, which application is hereby incorporated herein by reference.

TECHNICAL FIELD

The present disclosure relates generally to electronic devices and methods, and more particularly to devices and methods suitable for measuring the frequency of a signal. The present disclosure more specifically applies to a method and device configured to measure the frequency of a flicker of a light source.

BACKGROUND

Unlike natural light, most devices producing artificial light do not emit this light continuously, but rather alternatingly, for example periodically. The radiation of a light source therefore has a succession of variable light intensity states, called flicker.

For certain technical applications, it may be useful to measure the frequency of this flicker. This frequency can be useful in the case of image captures or a video.

It would be desirable to be able to improve, at least in part, certain aspects of devices suitable for measuring a frequency of a flicker of a light source.

SUMMARY

There is a need for devices suitable for measuring a frequency of a flicker of a light source with a better performance.

There is a need for devices suitable for measuring a frequency of a flicker of a light source more quickly.

One embodiment addresses all or some of the drawbacks of the known devices suitable for measuring a frequency of a flicker of a light source.

One embodiment provides a device configured to measure a frequency of a flicker of a light source with a better performance.

One embodiment provides a device configured to measure a frequency of a flicker of a light source more quickly.

One embodiment provides a device for measuring a flicker frequency of a light source configured to implement at least one phase lock loop.

According to one embodiment, the device comprises at least one processor and at least one flicker detector of the light source.

According to one embodiment, the processor and the flicker detector exchange data by means of a data bus.

According to one embodiment, the data bus is a bus of type I2C.

According to one embodiment, the processor is configured to implement an algorithm of the at least one phase lock loop.

According to one embodiment, the processor is configured to implement at least two algorithms of phase lock loops.

According to one embodiment, the processor is further configured to implement a spectral analysis using a Fourier transform function.

According to one embodiment, the spectral analysis using a Fourier transform function is suitable for configuring an algorithm of the at least one phase lock loop.

According to one embodiment, the flicker detector comprises a component configured to implement the at least one phase lock loop.

According to one embodiment, the component is a processor configured to implement an algorithm of the at least one phase lock loop.

According to one embodiment, the component is configured to implement the at least one phase lock loop physically.

Another embodiment provides a method for measuring a flicker frequency of a light source using a device previously described.

According to one embodiment, the method uses an algorithm of a phase lock loop.

According to one embodiment, the method uses a circuit implementing a phase lock loop.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 1 shows, schematically and in block diagram form, an embodiment of a device for measuring a flicker frequency of a light source;

FIG. 2 shows, schematically and in block diagram form, another embodiment of a device for measuring a flicker frequency of a light source;

FIG. 3 shows, schematically and in block diagram form, another embodiment of a device for measuring a flicker frequency of a light source; and FIG. 4 shows, schematically and in block diagram form, another embodiment of a device for measuring one or several flicker frequencies of a light source.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the methods and devices used to detect a flicker will not be described in detail in the remainder of the description. Indeed, the described embodiments and modes of implementation are compatible with the typical methods and devices for detecting a flicker of a light source.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

FIG. 1 shows, schematically and in block diagram form, an embodiment of a device 10 for measuring a flicker frequency of a light source 1.

The light source 1 is an artificial light source having a flicker, for example, periodic. As an example, the light source 1 is powered by an AC electrical power source characterized by a frequency, for example, of about 50 Hz or about 60 Hz. The flicker frequency of the source 1 is generally in the order of the frequency of the power supply by which the source 1 is powered, for example about 50 Hz or about 60 Hz. According to one variant, the frequency of the power supply by which the source 1 is powered is different from about 50 or about 60 Hz.

The device 10 comprises a flicker detector 12 (F. Det) and a processor 14 (CPU). The detector 12 and the processor 14 exchange data by means of a communication bus 16. As an example, the bus 16 is a bus of type I2C (Inter Integrated Circuit), type I3C (Improved Inter Integrated Circuit), or type SPI (Serial Peripheral Interface). According to another embodiment, the communication bus 16 can be a device configured to transmit an analog signal, the processor 14 in this case being configured to recover data from this analog signal by means of an analog digital converter.

The flicker detector 12 is a device configured to detect the light radiation from the light source 1, that is to say, its flicker, and to supply regular measurements of the amplitude of this flicker, hereinafter called sample Ech10. The detector 12 sends the samples Ech10 to the processor 14 by means of the bus 16.

The processor 14 comprises different components 18 (HW) and is configured to implement an algorithm of a phase lock loop shown in FIG. 1 by a block 19 (PLL). More particularly, the processor 14 is configured to receive instructions implementing an algorithm of a phase lock loop.

The components 18 comprise one or several integrated circuits suitable for receiving and sending the samples Ech10. As an example, the components 18 comprise at least one interface suitable for receiving information from the bus 16, for example an I2C interface, and one or several memories suitable for storing instructions implementing an algorithm of a phase lock loop. According to an embodiment variant, the components 18 can comprise an analog digital converter in the case where the samples Ech10 are sent in the form of an analog signal.

The processor 14 uses the algorithm of the phase lock loop to determine a frequency F10 of the samples Ech10. The phase lock loop algorithm receives, as input, the samples Ech10, and supplies, as output, the frequency F10 and a digital signal Sig10. The digital signal Sig10 is a digital signal with frequency equal to the frequency F10 and synchronized in phase with the samples Ech10.

The operation of the device 10 is as follows. As previously described, the flicker detector 12 is configured to detect the light radiation from the source 1, in other words its flicker, and to supply the successive samples Ech10 representative of this flicker. The samples Ech10 are supplied, by the detector 12, to the processor 14 by means of the bus 16. The processor 14 receives the samples Ech10 by using the different electronic components 18. The samples Ech10 are next used by the algorithm of the phase lock loop.

The algorithm of the phase lock loop makes it possible to have the frequency of one signal governed by the frequency of another signal, in the case at hand the frequency of the periodic digital signal Sig10 is governed by the frequency of the samples Ech10. At the beginning of governing, the digital signal Sig10 has an initial frequency Fini10 set by the algorithm. As an example, the initial frequency Fini10 can be set during the manufacturing of the device 10, or can be a parameter able to be modified by a builder or a user of the device 10. As an example, when the expected frequency of the samples Ech10 is in the order of 50 Hz or 60 Hz, the initial frequency Fini10 can be set at about 50 Hz or at about 60 Hz. The closer the initial frequency is to the frequency of the samples Ech10, the less time the algorithm will need to govern the signal Sig10. The frequency F10 corresponds to the frequency of the signal Sig10 once its frequency is governed by the samples Ech10.

One advantage of this embodiment is that the use of the algorithm of the phase lock loop allows a fast measurement of the frequency of a light flicker of the light source 1, for example, faster than a device using a spectral analysis with a Fourier transform function. As an example, with the use of the phase lock loop 19, the measurement of a frequency of a signal, such as a flicker, can be done in a duration for example shorter than 100 ms.

Another advantage of this embodiment is that the implementation of an algorithm of a phase lock loop requires a lower computing power of a processor than the implementation, by this same processor, of a spectral analysis with a Fourier transform function.

Another advantage of this embodiment is that the processor can choose the moment during which it will process the samples Ech10. Indeed, the samples Ech10 can be stored in a memory of the components 18 of the processor 14 until they are processed.

Another advantage of this embodiment is that the signal Sig10 synchronized on the samples Ech10 can be used by other components and/or other circuits of the device 10. As an example, such a signal Sig10 can be used by a camera of the ISP type (Image Signal Processor), or a processor of a camera.

FIG. 2 shows, schematically and in block diagram form, another embodiment of a device 20 able to measure a flicker frequency of the light source 1.

The device 20 comprises a flicker detector 22 (F. Det) and a processor 24 (CPU). The detector 22 sends data to the processor 24, by means of a data bus 26. The bus 26 is similar to the data bus 16 described in relation with FIG. 1.

The flicker detector 22 is made up of a detector 27 and a component 28 (PLL) configured to implement a phase lock loop.

The detector 27 is similar to the flicker detector 12 described in relation with FIG. 1. The detector 27 sends samples Ech10 representative of the flicker of the light source 1 to the circuit 28.

The component 28 configured to implement a phase lock loop is for example a processor configured to implement an algorithm of a phase lock loop, similar to the processor 14 described in relation with FIG. 1, or a circuit physically implementing a phase lock loop. The component 28 supplies, as output, a digital signal Sig20, and a frequency F20. The digital signal Sig20 is a digital signal with frequency equal to the frequency F20 and synchronized in phase with the samples Ech20.

The processor 24 receives the digital signal Sig20 and the frequency F20 by means of the bus 26. The processor 24 makes it possible to process these data.

One advantage of this embodiment is that the samples Ech20 are processed directly after they are detected by the component 28, which does not require an additional memory circuit.

Another advantage of this embodiment is that the implementation of an algorithm of a phase lock loop requires a lower computing power of a processor than the implementation, by this same processor, of a spectral analysis with a Fourier transform function.

Another advantage of this embodiment is that the signal Sig20 synchronized on the samples Ech20 can be used by other components and/or other circuits of the device 20. As previously stated, as an example, such a signal Sig20 can be used by a camera of the ISP type (Image Signal Processor), or a processor of a camera.

FIG. 3 shows, schematically and in block diagram form, an embodiment of a device 30 able to measure a flicker frequency of the light source.

The device 30 is similar to the device 10 described in relation with FIG. 1. The devices 10 and 30 comprise like elements. In the remainder of the description, these like elements will not be described in detail again, and only the differences between the two devices will be highlighted.

Like the device 10, the device 30 comprises a light flicker detector 12 and a processor 14 that communicate by means of a bus 16. The processor 14 comprises the different components 18 and is configured to implement the algorithm of a phase lock loop shown in FIG. 3 by the block 19.

The processor 14 is further configured to implement a Fourier transform function, and a spectral analysis using this Fourier transform function, shown in FIG. 3 by a block 31 (FFT). In particular, the processor 14 may comprise a memory including instructions implementing a spectral analysis using a Fourier transform function.

The operation of the device 30 is as follows. The flicker detector 12 is configured to detect the light radiation from the source 1, in other words its flicker, and to supply successive samples Ech30 representative of this flicker. The samples Ech30 are supplied, by the detector 12, to the processor 14 by means of the bus 16. The processor 14 receives the samples Ech30 by using the different electronic components 18. The samples Ech30 are next used by the algorithm of the phase lock loop, as described in relation with FIG. 1.

The processor can further perform a spectral analysis of the samples Ech30 in order to obtain a first estimate of its frequency. As an example, to perform this spectral analysis, the processor can use a part of the samples Ech30, for example, a duration portion of between 0.5 and 2 s, for example 1 s. This first estimate of the frequency of the samples Ech30 can for example be used to configure the initial frequency of the phase lock loop algorithm.

FIG. 4 shows, schematically and in block diagram form, an embodiment of a device 40 able to measure a flicker frequency of the light source.

The device 40 is similar to the devices 10 and 30 described in relation with FIGS. 1 and 3. The devices 40, 10 and 30 comprise like elements. Hereinafter, these like elements will not be described in detail again, and only the differences between these devices will be highlighted.

Like the devices 10 and 30, the device 40 comprises a flicker detector 12 and a processor 14 that communicate by means of a bus 16. The bus 16 communicates samples Ech40 representative of the light flicker of the source 1. The processor 14 comprises the different components 18. The components 18 receive and send the samples Ech40.

The device 40 is configured to detect several frequencies of the samples Ech40. The device 40 described in relation with FIG. 4 is more specifically configured to detect two frequencies of the samples Ech40, for example a primary frequency and a secondary frequency. As an example, the samples Ech40 can have several frequencies when they represent the flicker emitted by two separate light sources.

The processor 14 is configured to implement two phase lock loop algorithms shown, in FIG. 4, by blocks 41 and 42 (PLL). As an example, the algorithms of the blocks 41 and 42 can be implemented in parallel or successively. The algorithm of the block 41 makes it possible to govern the frequency of a signal Sig41, the signal Sig41 having, at the beginning of governing, an initial frequency Fini41. The algorithm of the block 42 makes it possible to govern the frequency of a signal Sig42, the signal Sig42 having, at the beginning of governing, an initial frequency Fini42. The initial frequencies Fini41 and Fini42 are different from one another. As an example, the deviation between the frequencies Fini41 and Fini42 is greater than 100 Hz, preferably greater than 100 Hz. As an example, the initial frequency Fini41 can be close to a primary frequency of the samples Ech40, and the initial frequency Fini42 can be close to a secondary frequency of the samples Ech40.

The operation of the device 40 is as follows. The flicker detector 12 is configured to detect the flicker of the source 1, and to supply the successive samples Ech40 representative of this flicker. The samples Ech40 are supplied, by the detector 12, to the processor 14, by means of the bus 16. The processor 14 receives the samples Ech40 by using the different electronic components 18. The samples Ech40 are next used by the phase lock loop algorithms of the blocks 41 and 42 in order to determine the primary and secondary frequencies thereof. The algorithms of the blocks 41 and 42 are implemented independently, and supply, at the output, frequencies F41 and F42 and the signals Sig41 and Sig42 governed by these frequencies.

One advantage of this embodiment is that is makes it possible to measure several frequencies of a flicker.

Various embodiments and variants have been described. Those skilled in the art will understand that certain features of these embodiments can be combined and other variants will readily occur to those skilled in the art. In particular, it is possible to adjust the initial frequencies of the algorithms of the blocks 41 and 42 of the device 40 by using a spectral analysis using a Fourier transform function.

Furthermore, the flicker detector 22, for example its component 28 could be configured to implement a spectral analysis using a Fourier transform function, so as to configure the phase lock loop as described in relation with FIG. 3.

Finally, the practical implementation of the embodiments and variants described herein is within the capabilities of those skilled in the art based on the functional description provided hereinabove.

What is claimed is:
1. A device, comprising:
a flicker detector circuit configured to detect light radiation signals from a light source and generate successive samples representing the light radiation signals; and
a processor coupled to the flicker detector circuit, the processor comprising a phase lock loop (PLL) circuit, the processor configured to:
determine a frequency of the light radiation signals using the PLL circuit and the successive samples generated by the flicker detector circuit, and generate a periodic digital signal synchronized in phase with the light radiation signals and having a frequency equal to the frequency of the light radiation signals.

2. The device according to claim 1, further comprising a communication bus interface for exchanging data between the processor and the flicker detector circuit.

3. The device according to claim 1, wherein the light radiation signals have a primary frequency and a secondary frequency, wherein the frequency of the light radiation signals is the primary frequency and the PLL circuit is a first PLL circuit, and wherein the processor further comprises a second PLL circuit, wherein the processor is configured to:
determine the secondary frequency of the light radiation signals using the second PLL circuit and the successive samples generated by the flicker detector circuit; and
generate a second periodic digital signal synchronized in phase with the light radiation signals and have a second frequency equal to the secondary frequency of the light radiation signals.

4. The device according to claim 1, wherein the processor is configured to implement a spectral analysis using a Fourier transform function to obtain a first estimate of the frequency of the light radiation signals, and wherein the first estimate is used by the PLL circuit to configure an initial frequency of a PLL algorithm applied by the PLL circuit.

5. The device according to claim 1, wherein the device is a camera, and wherein the camera is configured to process an image using the periodic digital signal.

6. The device according to claim 2, wherein the communication bus interface is an Inter Integrated Circuit (I2C) interface, an Improved Inter Integrated Circuit (I3C) interface, or a Serial Peripheral Interface (SPI).

7. The device according to claim 2, wherein the communication bus interface is configured to transmit the successive samples from the flicker detector circuit to the processor, the successive samples being an analog type signal, the processor further comprising an analog to digital converter to convert the successive samples from the analog type signal to a digital type signal.

8. The device according to claim 3, wherein the first PLL circuit is arranged in parallel or successively with respect to the second PLL circuit.

9. A method of operating a device, the method comprising:
detecting, by a flicker detector circuit, light radiation signals from a light source;
generating, by the flicker detector circuit, successive samples representing the light radiation signals;
determining, by a phase lock loop circuit of a processor, a frequency of the light radiation signals from the successive samples; and
generating a periodic digital signal synchronized in phase with the light radiation signals and having a frequency equal to the frequency of the light radiation signals.

10. The method according to claim 9, further comprising exchanging data, between the processor and the flicker detector circuit, via a communication bus interface, wherein the communication bus interface is an Inter Integrated Circuit (I2C) interface, an Improved Inter Integrated Circuit (I3C) interface, or a Serial Peripheral Interface (SPI).

11. The method according to claim 9, wherein the light radiation signals have a primary frequency and a secondary frequency, wherein the frequency of the light radiation signals is the primary frequency and the PLL circuit is a first PLL circuit, and wherein the method further comprises:
determining the secondary frequency of the light radiation signals using a second PLL circuit and the successive samples generated by the flicker detector circuit; and
generate a second periodic digital signal synchronized in phase with the light radiation signals and have a second frequency equal to the secondary frequency of the light radiation signals.

12. The method according to claim 9, further comprising implementing, by the processor, a spectral analysis using a Fourier transform function to obtain a first estimate of the frequency of the light radiation signals, and wherein the first estimate is used by the PLL circuit as an initial frequency of a PLL algorithm applied by the PLL circuit.

13. The method according to claim 9, further comprising processing, by a camera, an image using the periodic digital signal.

14. The method according to claim 10, further comprising:
transmitting the successive samples from the flicker detector circuit to the processor via the communication bus interface, the successive samples being an analog type signal; and
converting, by an analog to digital converter, the successive samples from the analog type signal to a digital type signal.

15. A device, comprising:
a flicker detector circuit configured to detect light radiation signals from a light source and generate successive samples representing the light radiation signals;
a non-transitory memory storage comprising instructions; and
a processor coupled to the flicker detector circuit and the non-transitory memory storage, the processor executes the instructions to:
determine a first frequency of the light radiation signals using a first phase lock loop (PLL) circuit and the successive samples generated by the flicker detector circuit,
generate a first periodic digital signal synchronized in phase with the light radiation signals and having a frequency equal to a primary frequency of the light radiation signal,
determine a second frequency of the light radiation signals using a second PLL circuit and the successive samples generated by the flicker detector circuit,
generate a second periodic digital signal synchronized in phase with the light radiation signals and having a frequency equal to a secondary frequency of the light radiation signal, and
process an image using the first period digital signal and the second period digital signal.

16. The device according to claim 15, wherein the processor is configured to implement a spectral analysis using a Fourier transform function to obtain a first estimate of the first frequency of the light radiation signals, and wherein the first estimate is used by the first PLL circuit to configure an initial frequency of the first frequency in a first PLL algorithm applied by the first PLL circuit.

17. The device according to claim 15, wherein the first PLL circuit is arranged in parallel or successively to the second PLL circuit.

18. The device according to claim 15, further comprising a communication bus interface for exchanging data between the processor and the flicker detector circuit, wherein the communication bus interface is an Inter Integrated Circuit (I2C) interface, an Improved Inter Integrated Circuit (I3C) interface, or a Serial Peripheral Interface (SPI).

19. The device according to claim 15, wherein the processor is configured to implement a spectral analysis using a Fourier transform function to obtain a first estimate of the frequency of the light radiation signals, and wherein the first estimate is used by the first PLL circuit to configure an initial frequency of a PLL algorithm applied by the first PLL circuit.

20. The device according to claim 15, wherein the non-transitory memory storage comprises instructions that the processor executes to apply a spectral analysis on the successive samples using a Fourier transform function to obtain an initial frequency for the first PLL circuit.

\* \* \* \* \*